United States Patent Office 3,387,926
Patented June 11, 1968

3,387,926
PREPARATION OF SODIUM METASILICATE
PENTAHYDRATE
Bob R. Harrell, deceased, late of Lake Jackson, Tex., by Shirley S. Harrell, legal representative, Austin, Tex., Robert D. Goodenough, Midland, Mich., and Richard L. Gregory, Columbus, Ohio; said Goodenough and said Gregory assignors to The Dow Chemical Company, Midland, Mich., a corporation of Delaware
No Drawing. Filed Oct. 1, 1964, Ser. No. 435,391
5 Claims. (Cl. 23—110)

ABSTRACT OF THE DISCLOSURE

The present invention concerns a method of preparing sodium metasilicate pentahydrate from an aqueous solution of sodium silicate and sodium chloride containing at least 0.25 weight percent of said silicate and a weight ratio of $Na_2O$ to $SiO_2$ of from 2 to 1, comprising: mixing said solution with substantially anhydrous ammonia in an amount by weight of from 8 to 30 percent of the final resulting ammoniacal solution while maintaining a maximum reaction temperature of about 100° C., and separating sodium metasilicate pentahydrate therefrom.

Sodium metasilicate has been prepared by reacting silica ($SiO_2$) with concentrated sodium hydroxide solutions under conditions of high temperature and pressure. Ordinarily the sodium hydroxide used is obtained from the electrolysis of brines. These brines contain large amounts of sodium chloride and other salts some of which remain in the sodium hydroxide product and eventually contaminate the sodium metasilicate produced therefrom. Further, anhydrous sodium metasilicate can be prepared by fusing silica ($SiO_2$) and soda ash ($Na_2Co_3$) at about 1450° C. This process produces a glass. These processes have several drawbacks. The sodium metasilicate product produced by said processes contains large amounts of impurities such as sodium chloride and other alkali metal salts. In addition these processes are expensive to carry out due to the high temperature and pressure requirements thereof. The above described caustic fusion process, is entirely unfeasible as a commercial process for economically preparing sodium metasilicate.

Therefore it is apparent that the economical preparation of a sodium metasilicate substantially free from sodium chloride from aqueous solutions containing sodium chloride and other alkali metal salts has long been an unsolved problem.

It is a principal object of the instant invention to provide a method of recovering substantially pure sodium metasilicate in the pentahydrate form from aqueous solutions of sodium silicate, said aqueous solutions containing impurities such as sodium chloride and other alkali metal salts.

It is an additional object to provide a method for the recovery of a substantially pure hydrated form of sodium metasilicate which does not require high temperature and high pressures in carrying out said recovery method.

These and other objects and advantages of the instant invention will become apparent from reading the detailed description thereof set forth hereinafter.

In general, the instant invention is a method for preparing relatively pure sodium metasilicate in the pentahydrate form from aqueous solutions of sodium silicate and sodium chloride which comprises providing an aqueous solution of at least 0.25 percent by weight sodium silicate containing a weight ratio of $Na_2O/SiO_2$ within the range of from about 2 to about 1. Substantially anhydrous ammonia, either gaseous or liquid, is then mixed with the solution in an amount of from about 8 to about 30 percent by weight of the final ammoniated aqueous solution while maintaining the temperature from about 20° to about 80° C. A precipitate of sodium metasilicate pentahydrate thereby forms. The pentahydrate precipitate is separated from the solution as for example by filtration, decantation, centrifugation or other liquid-solid separatory procedures to produce a substantially pure product of sodium metasilicate in the pentahydrate form.

In carrying out a preferred embodiment of the instant method a solution containing sodium silicate in a concentration of from about 0.25 to about 11.6 percent by weight and containing a weight ratio of $Na_2O/SiO_2$ of about 1 is employed. Such a solution can be prepared for example, by reacting an aqueous sodium hydroxide solution with silica ($SiO_2$) in a weight ratio of $NaOH/SiO_2$ of from about 1.33 to about 1.50 at a temperature of about 210° C. under a pressure of about 240 p.s.i.g. for about one half hour. Having prepared the sodium silicate solution, the sodium metasilicate pentahydrate is recovered therefrom free of sodium chloride and other impurities present in the reaction material by adding ammonia to said solution in an amount of from about 8 to about 30 percent, and preferably 15 to 20%, by weight of the final ammoniated solution while maintaining the temperature from about 0° to about 100° C. and preferably from about 25 to about 75° C. Sodium metasilicate pentahydrate precipitates from the solution and is separated therefrom.

Where caustic solutions are used containing unusually high amounts of impurities there may be some sodium chloride physically adhering to the pentahydrate product. These impurities can easily be removed therefrom by washing the product with an aqueous ammonia solution.

The instant method can be carried out at about room temperature with good yields and recoveries of sodium metasilicate pentahydrate. Recoveries of the substantially pure product are increased when the temperature is raised from about 25° C. to about 50° C., and to about 75° C. However, since the solubility of sodium metasilicate in the final ammoniated solution increases with increasing temperatures slightly more ammonia is required in the precipitation step at elevated temperatures to achieve similar yields at ambient temperatures.

As stated hereinbefore, the presence of sodium chloride along with other alkali metal halides and sulfates, such as lithium, potassium, and sodium-chlorides, bromides and sulfates, in aqueous solutions of caustic from electrolytic cells, for example and silica or sodium metasilicate, has long hindered the recovery of substantially pure sodium metasilicate from said solution. An unexpected advantage of the present process is that the presence of sodium chloride, in certain instances can actually enhance the precipitation of the high purity sodium metasilicate·pentahydrate in the present novel process. Thus, where substantially anhydrous ammonia is added to an aqueous solution of sodium silicate containing at least 12 percent by weight sodium chloride, the ammonia being present in an amount of from about 8 to less than about 15 percent by weight of the final ammoniated solution, the solubility of sodium metasilicate in said solution is lowered due to the presence of said sodium chloride, and readily precipitates therefrom.

If the aqueous solution contains sodium sulfate along with the sodium silicate and sodium chloride, the addition of the required amounts of anhydrous ammonia thereto produce a three layer system which is easily separable from each other. The three layer system is comprised of an upper layer containing sodium chloride, ammonia and water, a lower crystalline layer containing sodium sulfate and a middle layer containing sodium metasilicate pentahydrate. The metasilicate product can be recovered from the three layer system as follows: the three phases are separated in a series of decanter-settler tanks. The sodium metasilicate pentahydrate product is finally separated from solution using a pressure centrifuge. Aqueous ammonia (28% NH$_4$OH) can be used as a wash solution in washing the pentahydrate precipitate.

Sodium metasilicate pentahydrate finds great utility as a saponifying agent, in the manufacture of glues and adhesives and in the manufacture of foundry cores.

The following examples are merely illustratively of the instant invention and in no way meant to limit it thereto.

Example I

An aqueous, mutually saturated solution, containing about 11.56 percent by weight sodium metasilicate (Na$_2$O/SiO$_2$ ratio of about 1) and about 19.16 percent by weight sodium chloride was prepared as follows:

About 19.16 grams of reagent grade NaCl and about 26.9 grams of reagent grade Na$_2$SiO$_3$·9H$_2$O were mixed in about 53.94 grams of distilled water.

About 100 grams of the so prepared metasilicate solution were placed in an 8 inch glass pressure tube. The pressure tube was fitted with an ammonia pressure gage and two-⅜ inch stainless steel valves, one connected to a ⅛ inch stainless steel tube protruded below the solution surface and the other connected to a 5/16 inch stainless steel tube terminating above the solution surface. The glass pressure vessel was immersed in a constant temperature bath wherein the temperature was maintained at 25±0.1° C.

Gaseous anhydrous ammonia was then bubbled into the sample solution from a pressure cylinder through the lower valve until the amoniated solution contained about 22.9 percent by weight or about 23 grams of ammonia. The ammoniation was then discontinued and the reaction mixture was allowed to stand for about 2 hours in order to insure equilibrium and complete phase separation. A precipitate was thereby formed. The precipitate was filtered from the solution, washed with aqueous ammonia (28% NH$_4$OH) and dried at about 75° C. for about 2 hours in a laboratory oven. The mother liquor contained: about 22.9% NH$_3$, about 19.1% NaCl, about 0.2% Na$_2$SiO$_3$ and the balance as water. The precipitate weighed about 22 grams and was analyzed on a dry basis and found to contain:

about 91.2 percent by weight Na$_2$SiO$_3$·5H$_2$O
about 0.39 percent by weight NaCl
and the remainder being non-hydrated water.

Thus it is seen that about 98 percent of the sodium silicate originally present in solution was recovered as a dry substantially pure product of sodium metasilicate pentahydrate.

If desired the product can be purified further by washing it with ammonia solution.

Example II

In order to show the affect of sodium sulfate in the NaCl, Na$_2$SiO$_3$·5H$_2$O, H$_2$O system, about 1–2 grams of Na$_2$SO$_4$ were added to about 100 grams of an aqueous solution containing about 19.16 grams of NaCl, about 11.56 grams of Na$_2$SiO$_3$ and about 69.28 grams of H$_2$O.

In a manner similar to that set forth in Example I, about 23 grams of ammonia were added to the above solution. The temperature was held constant at about 25° C. A three layer mixture resulted which when analyzed was found to consist of a bottom layer of Na$_2$SO$_4$ crystals, a middle layer of Na$_2$SiO$_3$·5H$_2$O, and a top layer of NH$_3$, NaCl and H$_2$O. The Na$_2$SiO$_3$·5H$_2$O was separated from the solution by settling and decantation. Aqueous ammonia (28% NH$_4$OH) was used as a wash solution. The metasilicate was then dried at about 75° C. for about 2 hours in a laboratory oven. The product weighed about 21.6 grams and was analyzed and found to contain:

about 90 percent by weight Na$_2$SiO$_3$·5H$_2$O
about 0.38 percent by weight NaCl
about 1.32 percent by weigth Na$_2$SO$_4$
with the remainder being non-hydrated water.

About 95 percent of the sodium silicate originally present in solution was recovered as a substantially pure sodium metasilicate pentahydrate. The product can be purified further by washing it with ammonia solutions.

Various modifications can be made in the instant invention without departing from the spirit or scope thereof, for it is to be understood that we limit ourselves only as defined in the appended claims.

What is claimed is:

1. A method for preparing sodium metasilicate pentahydrate from an aqueous solution of sodium silicate and sodium chloride which comprises:
   (a) providing an aqueous solution of at least 0.25 percent by weight sodium silicate containing a weight ratio of Na$_2$O to SiO$_2$ within the range of from about 2 to about 1, said solution containing at least sodium chloride as an impurity;
   (b) mixing said aqueous solution with substantially anhydrous ammonia in an amount of from about 8 to about 30 percent by weight of the final ammoniated aqueous solution, maintaining the temperature of the ammoniated aqueous solution in the range of from about 0° C. to about 100° C., thereby precipitating out sodium metasilicate pentahydrate from said aqueous solution; and
   (c) separating and recovering said sodium metasilicate pentahydrate from said aqueous solution substantially free from sodium chloride.

2. The method in accordance with claim 1 wherein said sodium chloride is present in said aqueous solution in an amount of at least about 12 percent by weight of said solution and wherein anhydrous ammonia is added to said aqueous solution in an amount of from about 8 to about 15 percent by weight of the final ammoniated solution.

3. The method in accordance with claim 1 wherein said aqueous solution contains from about 0.25 to about 11.6 percent by weight of said sodium silicate and a weight ratio of Na$_2$O to SiO$_2$ of about 1.

4. The method in accordance with claim 1 wherein ammonia is added to the aqueous solution in an amount of from about 15 to 20 percent by weight of the final ammoniated solution.

5. The method in accordance with claim 1 including the step of maintaining the temperature of the ammoniated aqueous solution in the range of from about 20° C. to about 80° C.

References Cited

UNITED STATES PATENTS 2,067,227  1/1937  Baker _____ 23—110
3,208,822  9/1965  Baker et al. _____ 23—110

OTHER REFERENCES

Ser. No. 270,689, Kusman (A.P.C.), published April 1943.

Chem. Abstracts—Vol. 52, p. 6037c.

EARL C. THOMAS, *Primary Examiner.*

OSCAR R. VERTIZ, *Examiner.*

A. J. GREIF, *Assistant Examiner.*